United States Patent

Hirose et al.

[11] Patent Number: 6,157,097
[45] Date of Patent: Dec. 5, 2000

[54] PROTECTING METHOD FOR INRUSH CURRENT PREVENTING RESISTOR

[75] Inventors: Kenji Hirose; Akihisa Ono, both of Kitakyushu, Japan

[73] Assignee: Kabushiki Kaisha Yaskawa Denki, Kitakyushu, Japan

[21] Appl. No.: 09/331,153

[22] PCT Filed: Dec. 18, 1997

[86] PCT No.: PCT/JP97/04694

§ 371 Date: Jun. 17, 1999

§ 102(e) Date: Jun. 17, 1999

[87] PCT Pub. No.: WO98/28835

PCT Pub. Date: Jul. 2, 1998

[30] Foreign Application Priority Data

Dec. 20, 1996 [JP] Japan ................................ 8-355248

[51] Int. Cl.[7] .................................................. H01H 83/20
[52] U.S. Cl. .......................................... 307/125; 323/908
[58] Field of Search .................... 361/58, 93.9; 307/125, 307/131, 132 R; 323/908

[56] References Cited

FOREIGN PATENT DOCUMENTS

| 3-89861 | 4/1991 | Japan . |
| 4-79583 | 3/1992 | Japan . |
| 6-141548 | 5/1994 | Japan . |
| 7-322484 | 12/1995 | Japan . |

*Primary Examiner*—Stephen W. Jackson
*Assistant Examiner*—Rios Roberto
*Attorney, Agent, or Firm*—Armstrong, Westerman, Hattori, McLeland & Naughton

[57] ABSTRACT

For the purpose of preventing generation of burning or disconnection of an inrush current preventing resistor (3) when making and breaking of an AC power supply are frequently repeated, energy to be charged to a smoothing capacitor (4) at the time of making the power supply is calculated from the capacitance of the smoothing capacitor (4) of a capacitor-input type rectifying circuit and value of a rectifying smoothing DC voltage, and a mean power is calculated from the energy and the number of times of power making and breaking within a predetermined period of time. If the mean power exceeds an allowable power of the inrush current preventing resistor (3) for preventing an inrush current at the time of making the power supply, warning by an alarm display or an alarm output and power non-making interlock are carried out, and driving of a load-side device is stopped. In the case where the capacitance of the smoothing capacitor (4) and the value of the rectifying smoothing DC voltage are known in advance, the number of power on/off times within a predetermined period of time is counted. If the number of times exceeds a predetermined number, warning by an alarm display or an alarm output and power non-making interlock are carried out, and driving of the load-side device is stopped.

6 Claims, 4 Drawing Sheets

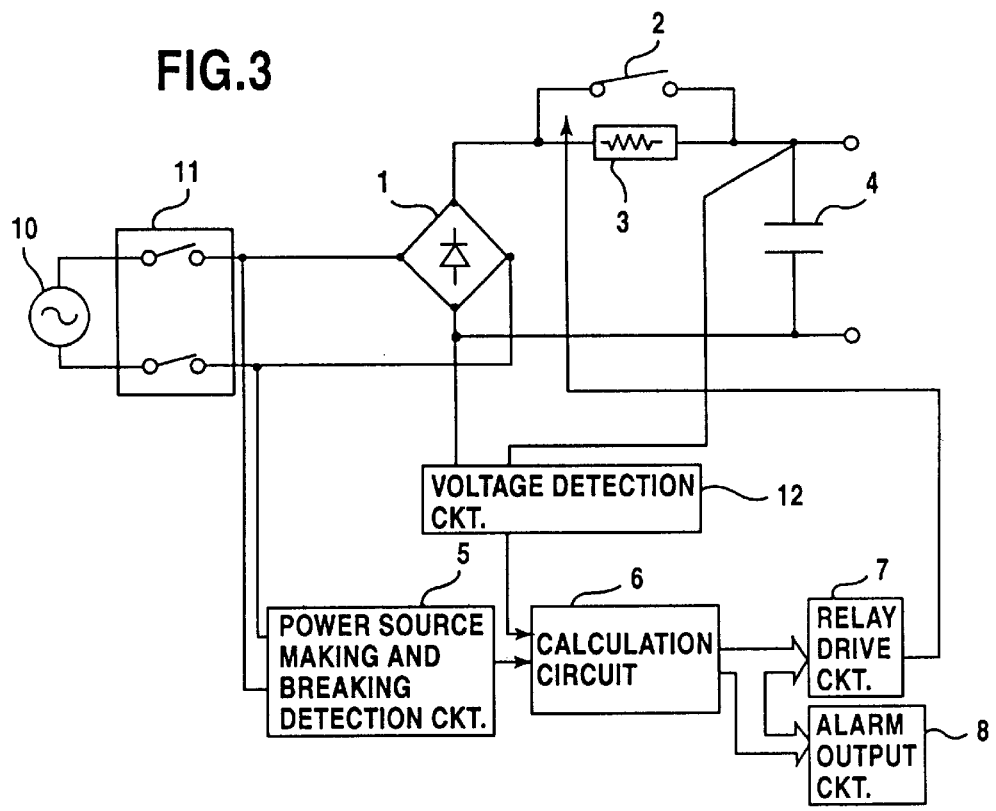
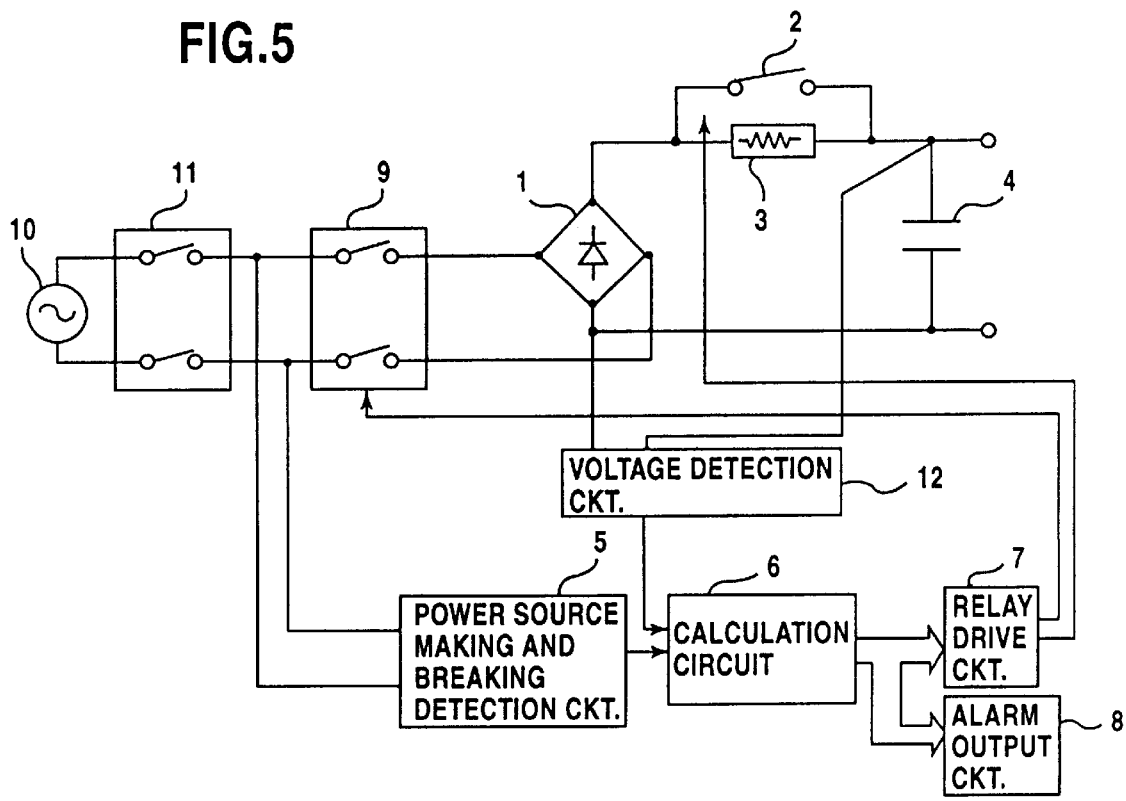

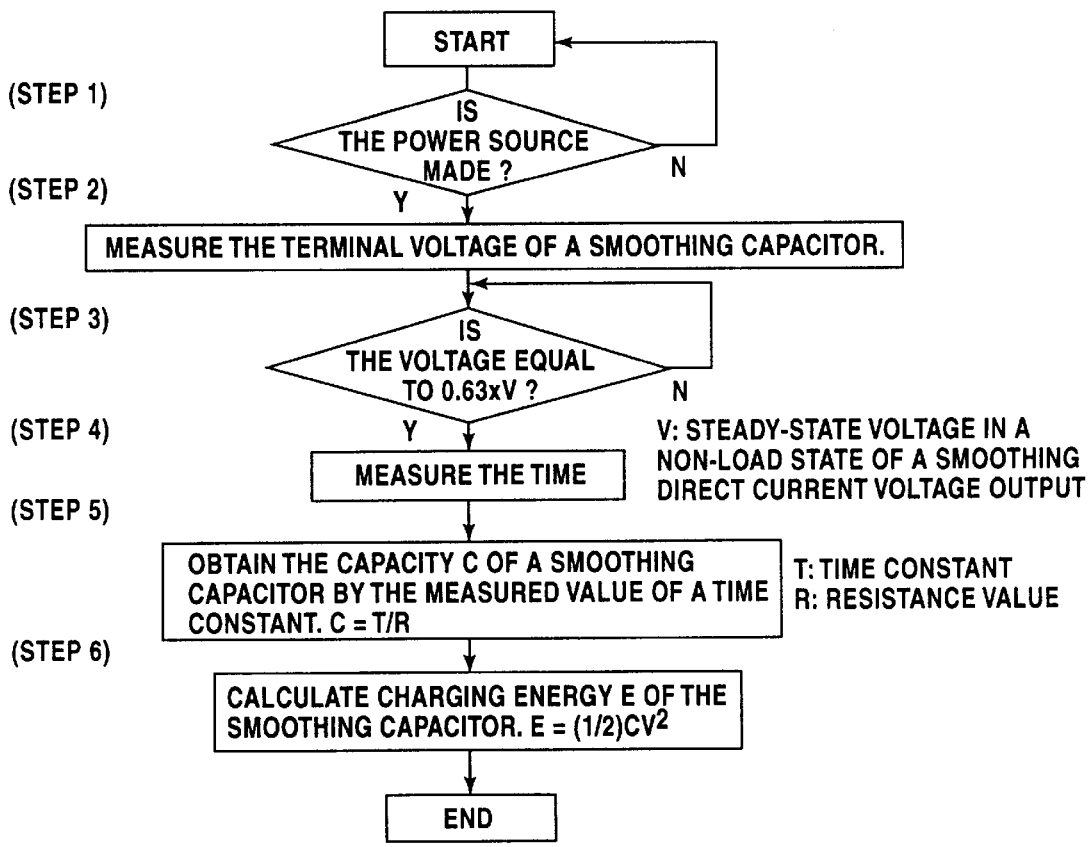
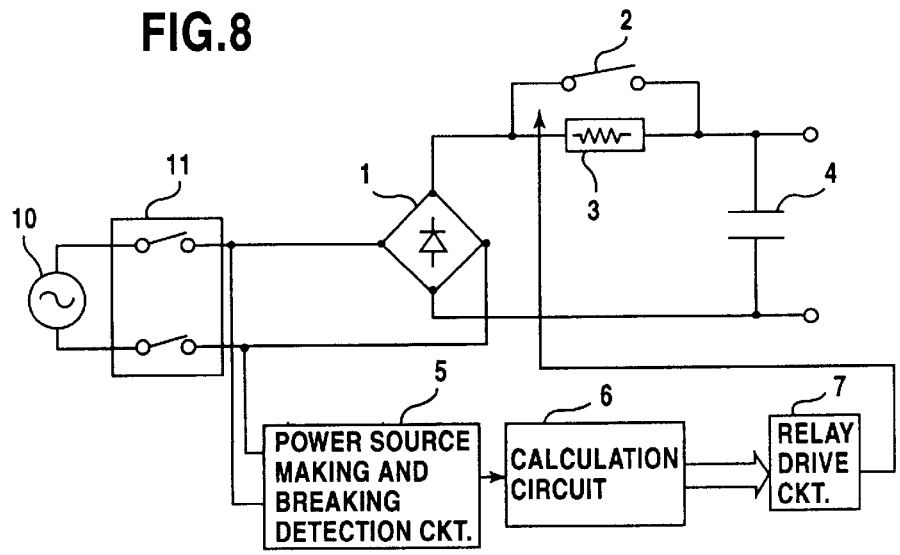

PROTECTING METHOD FOR INRUSH CURRENT PREVENTING RESISTOR

TECHNICAL FIELD

The present invention relates to a method for protecting a resistor, for preventing a rush current in turning on a power source, of a power source apparatus having a capacitor input type rectification circuit.

BACKGROUND OF ARTS

Conventionally, as shown in FIG. 8, a power source apparatus consisting of a capacitor input type rectification circuit is provided with a resistor 3 for preventing a rush current before a smoothing capacitor 4, in order to prevent a rush current in turning on the power source, and is composed so that the resistor 3 for preventing a rush current is short-circuited by a relay 2, etc., after charging to the smoothing capacitor 4 is completed. In the same drawing, a rectification circuit is indicated by 1, a detection circuit for detecting making or breaking of the power source is indicated by 5, a calculation circuit using, for example, a microcomputer, is indicated by 6, and a relay drive circuit is indicated by 7. In addition, an alternate current power source is indicated by 10, and a contactor 11 is used to turn on and off the alternate current power source.

The alternate current power source 10 is made by the contactor 11, an electric current for charging the smoothing capacitor 4 flows via the resistor 3 for preventing a rush current. The relay 2 is provided so that, by short-circuiting the resistor 3 for preventing a rush current after charging of the smoothing capacitor is completed, voltage drop or power loss does not occur by an electric current flowing into the resistor 3 for preventing a rush current in usual operations of a power source apparatus.

When the alternate power source 10 is made, energy (E) charged in the smoothing capacitor 4 is given by the following expression:

$$E = (\tfrac{1}{2}) \cdot CV^2 \quad (1)$$

where C is the capacity [F] of a capacitor, and V is direct power source voltage [V] which is rectification-smoothed. Herein, where it is assumed that making and breaking are carried out N times in a certain time period t [sec.], at this time, the mean voltage P[W] can be expressed by the following expression (2).

$$P = EN/t \quad (2)$$

Almost all of the power is consumed by the resistor 3 for preventing a rush current.

Therefore, if the alternate current power source 10 is frequently made and broken, there may be cases where the power P[W] expressed by the expression (2) exceeds a permissible power of the resistor 3 for preventing a rush current, and reaches a burn-out or interruption.

However, since there is usually a method for using the power capacitor (W) of the resistor 3 for preventing a rush current in only a limited period of closing the power source, there are many cases where the power capacity is small although the overload capacity is high. Therefore, if the power source is frequently turned on and off, the temperature rise becomes high, whereby there causes a problem by which the resistor 3 for preventing a rush current is burnt out or interrupted.

Accordingly, it is an object of the invention to prevent in advance a resistor for limiting a rush current into a smoothing capacitor of a power source apparatus having a capacitor input type rectification circuit, from being burnt out or interrupted.

DISCLOSURE OF THE INVENTION

The invention is featured in that energy is calculated, which is charged from a smoothing capacitor in making the power source from the capacity of a smoothing capacitor of a capacitor input type rectification circuit and a value of rectification smoothing direct current voltage; mean power is calculated from the above energy and the number of times of making and breaking the power source, which have been carried out in a determined period of time; and a warning is issued by alarm indication or alarm output where the mean power exceeds a permissible power of a resistor for preventing a rush current in making the power source, wherein an interlock is secured so that the power source cannot be made, or a load side apparatus is stopped so as not to drive.

If the capacity of a smoothing capacitor and the value of a rectification smoothing direct current voltage are known in advance, the number of times of making and breaking the power source, which is permissible in a certain determined period of time, can be calculated by using the expressions (1) and (2). Therefore, if the number of times of turning on and off the power source exceeds the predetermined number of times, a wearing is issued by alarm indication or alarm output.

BRIEF DESCRIPTION OF THE DRAWINGS

FIG. 3 is a view showing a third preferred embodiment of the invention,

FIG. 4 is an explanatory view of a procedure for calculating energy,

FIG. 5 is a view showing a fourth preferred embodiment of the invention,

FIG. 8 is a view showing a prior art example.

BEST MODE FOR CARRYING OUT THE INVENTION

Figure 1:
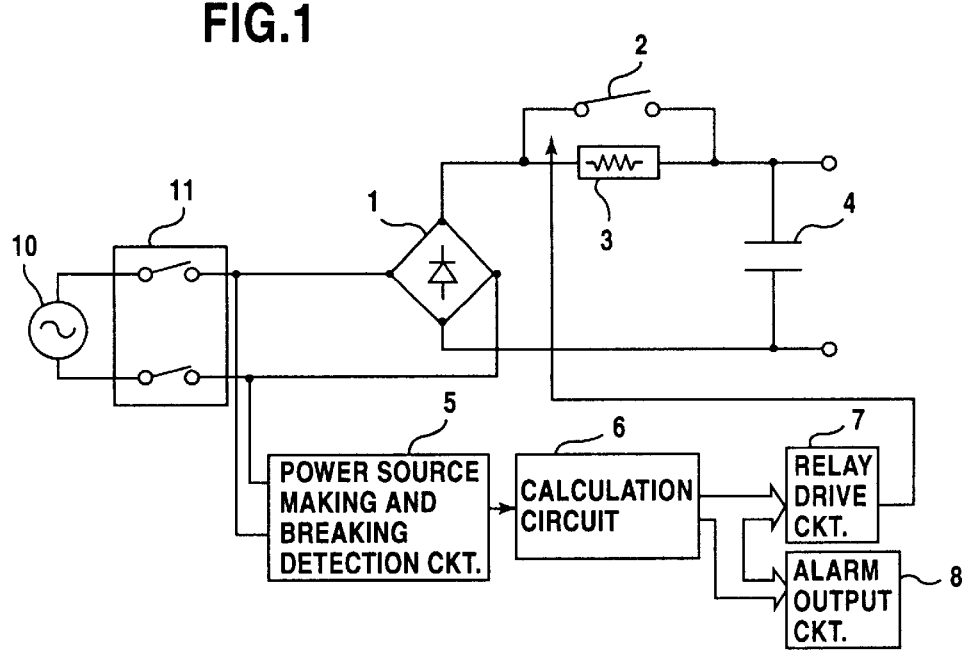
FIG. 1 is a view showing a first preferred embodiment of the invention.

Hereinafter, a description is given of the first preferred embodiment of the invention with reference to FIG. 1. Parts which are identical to those in FIG. 8 explaining a prior art example are given the same reference numbers, and description thereof is omitted. The preferred embodiment is such that the number of times of making and breaking a power source is stored by a calculation circuit 6, and alarm indication or warning is issued by an alarm indicator or an alarm output circuit 8 when power obtained by the expression (2) exceeds permissible power of the resistor 3 for preventing a rush current. If the capacity of a smoothing capacitor and a value of a direct current power source voltage are known in advance, only the number of times of turning on and off the power source, which have been carried out in a fixed period of time, is calculated, wherein if the actual number of times of turning on and off exceeds the predetermined number of times, a warning is issued by alarm indication or alarm output. It is possible to establish an interval of time to be calculated, by having obtained an overload capacity of a resistor 3 for preventing a rush current. In addition, the relay 2 shown in FIG. 1 is not limited to a relay, wherein a semiconductor switch such as a thyristor or a contactor, if power is great, may be used instead of the relay. The timing of making and breaking the relay is controlled by the calculation circuit 6 upon receiving signals of the power source making and breaking detection circuit 5.

That is, the power source making and breaking detection circuit 5 outputs an "L" level signal when the power source is made, and outputs an "H" level signal when the power source is broken. Upon receiving an "L" level signal of the power source making and breaking detection circuit 5 when making the power source, the calculation circuit 6 gives a making signal of the relay 2 to the relay drive circuit 7 after a sufficiently longer period of time than a time constant which is obtained by multiplying a resistance value of a resistor 3 for preventing a rush current by the capacity of the capacitor 4. In addition, at the same time, the number of times of making the power source is stored. Further, with an "H" level signal of breaking the power source, the relay drive circuit 7 is given a breaking signal of the relay 2. Thus, the calculation circuit 6 gives a control signal to the relay drive circuit 7, stores the number of times of making and breaking the power source, calculates power based on the expression (2), and issues a warning by an alarm indicator or an alarm output circuit 8 when the calculated power exceeds permissible power of the resistor 3 for preventing a rush current.

Figure 2:
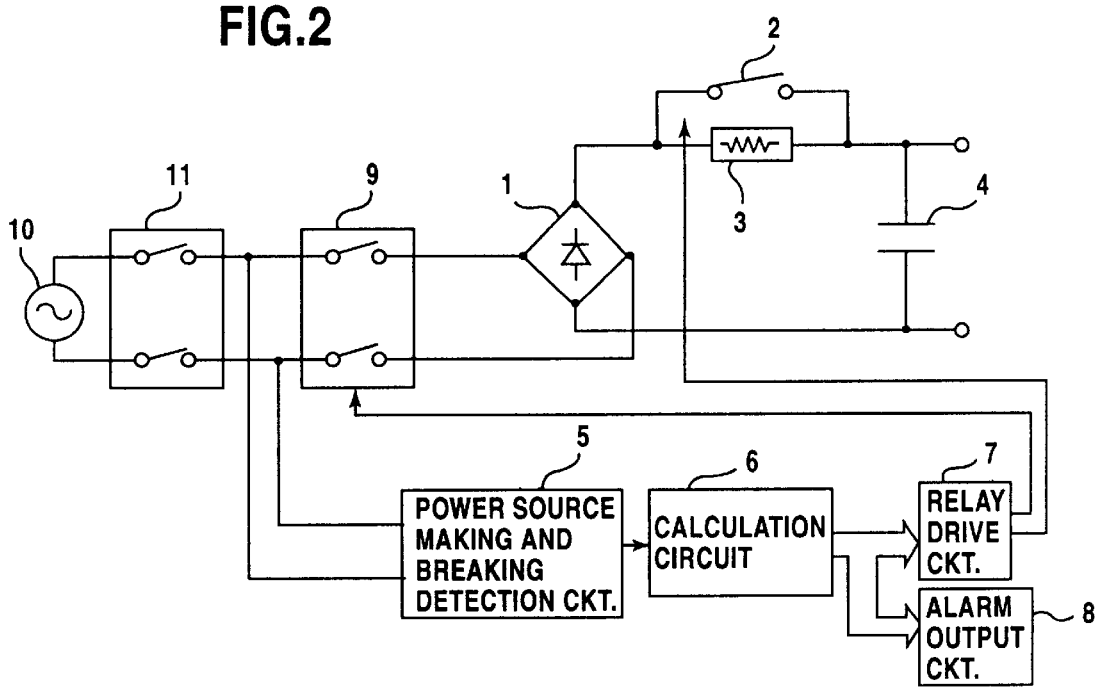
FIG. 2 is a view showing a second preferred embodiment of the invention.

FIG. 2 shows the second preferred embodiment of a power source apparatus. The circuits thereof are configured so that not only a warning is indicated by an alarm indicator or warning is output by an alarm output circuit, but also a relay 9 stops supply of the alternate current power source if making or breaking of the power source, which exceeds permissible power of the resistor for preventing a rush current, is carried out.

Hereinafter, a description is given of the actions in FIG. 2. First, it is assumed that the alternate current power source 10 is made by turning on the contactor 11. As the power source making and breaking detection circuit 5 detects that the alternate current power source 10 is made, the calculation circuit 6 gives the relay drive circuit 7 a signal for making the relay 9. Subsequently, the relay 9 is turned on. After the relay 9 is turned on and the smoothing capacitor 4 is charged, the calculation circuit 6 outputs a signal for turning on the relay 2. In addition, when the power source is broken, a signal for breaking the relay 2 and relay 9 is given to the relay drive circuit 7. If the frequency of making and breaking the power source is high and the power obtained by the expression (2) exceeds permissible power of a resistor for preventing a rush current, the calculation circuit 6 outputs a warning indication to an alarm indicator or an alarm output circuit 8, and at the same time, gives a signal for breaking the relays 2 and 9 to the relay drive circuit 7. There are many cases where a contactor 11 is located by the power source instead of the relay 9 and manual operation such as a knife switch is carried out, wherein it is preferable that a relay 9 of good maneuverability is used.

Further, FIG. 1 and FIG. 2 show a case of a rectification circuit of a mono-phase alternate current power source. The rectification circuit is not limited to only that for a mono-phase alternate current power source. It may be constructed as described above, even in cases of three-phase alternate current power source, and a multi-phase alternate current power source.

Hereinafter, a description is given of the third preferred embodiment of the invention with reference to FIG. 3. In the same drawing, a voltage detector 12 is to measure a terminal voltage of a smoothing capacitor.

If the alternate current power source 10 is made by the contactor 11, an electric current for charging the smoothing capacitor 4 flows via the resistor 3 for preventing a rush current. At this time, the time constant by which the smoothing capacitor 4 is charged is given by the following expression.

$$T = RC \quad (3)$$

where R is a resistance value [Ω] of a resistor 3 for preventing a rush current, and C is a capacity [F] of a smoothing capacitor. Therefore, if the time constant T and a value of the resistance value R are known, the value of C can be calculated. Generally, since the imbalance of the value R is smaller than that of the capacity value of the smoothing capacitor, the design value may be substituted. The time constant T can be obtained by a transient change amount of the terminal voltage of a smoothing capacitor when making the power source. That is, if the steady-state voltage is V[V] at non-load of the smoothing direct current voltage output, it is possible to obtain the value T by measuring the time till the terminal voltage of the smoothing capacitor reaches approx. 0.63V[V], and V is detected by the voltage detection circuit 12.

When charging the alternate current power source 10, energy E charged in the capacitor can be calculated by a procedure in FIG. 4.

Hereinafter, a description is given of a calculation procedure of the energy E in compliance with FIG. 4. It is monitored whether or not the alternate current power source 10 is made by the power source making and breaking detection circuit 5 and calculation circuit 6 (Step 1). Next, the calculation circuit 6 reads the value of the voltage detection circuit 12, and the terminal voltage of the smoothing capacitor is measured (Step 2). It is judged by the calculation circuit 6 whether or not the terminal voltage of the smoothing capacitor has become 0.63V[V] (Step 3). Subsequently, the time required for reaching the voltage is calculated by the calculation circuit 6 (Step 4). Next, the time constant T is obtained by the calculation circuit 6 on the basis of the time obtained in Step 4, and the capacity C of the smoothing capacitor is calculated (Step 5). After that, the energy E is calculated by the calculation circuit 6 (Step 6).

FIG. 5 shows the fourth preferred embodiment of a power source apparatus. The circuits thereof are configured so that not only a warning is indicated by an alarm indicator or a warning is output by an alarm output circuit 8, but also a relay 9 stops supply of alternate current power source if making or breaking of the power source, which exceeds the permissible power of the resistor 3 for preventing a rush current, is carried out.

Hereinafter, a description is given of actions in FIG. 5. First, it is assumed that the alternate current power source 10 is made by turning on the contactor 11. As the power source making and breaking detection circuit 5 detects that the alternate current power source is made, and the circuit 5 outputs a signal to the calculation circuit 6, wherein the relay 9 is turned on. As the relay 9 is turned on, the smoothing capacitor 4 is charged. However, at this time, the capacity of the smoothing capacitor 4 is simultaneously obtained in compliance with the above procedures consisting of Steps 1 through 5, and charging energy is calculated. After that, after a sufficiently longer time than the charging time constant of the smoothing capacitor 4 elapses, the calculation circuit 6 outputs a signal for turning on the relay 2. In addition, if the power source is broken, a signal for breaking the relays 2 and 9 is given to the relay drive circuit 7. If the frequency of making and breaking the power source is high and power given by the expression (1) exceeds permissible power of the resistor 3 for preventing a rush current, the calculation circuit 6 indicates or outputs a warning by an alarm indicator or an alarm output circuit 8, and at the same time, gives a signal for breaking the relays 2 and 9 to the relay drive circuit 7.

Figure 6:
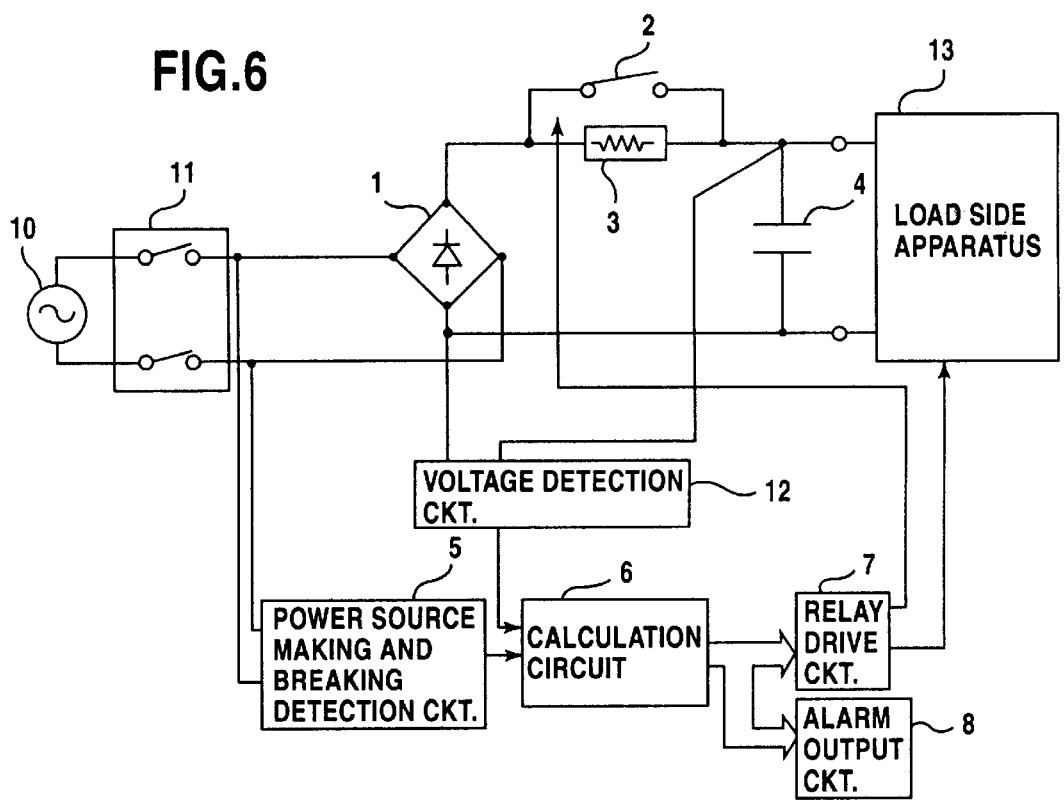
FIG. 6 is a view showing a fifth preferred embodiment of the invention.
Figure 7:
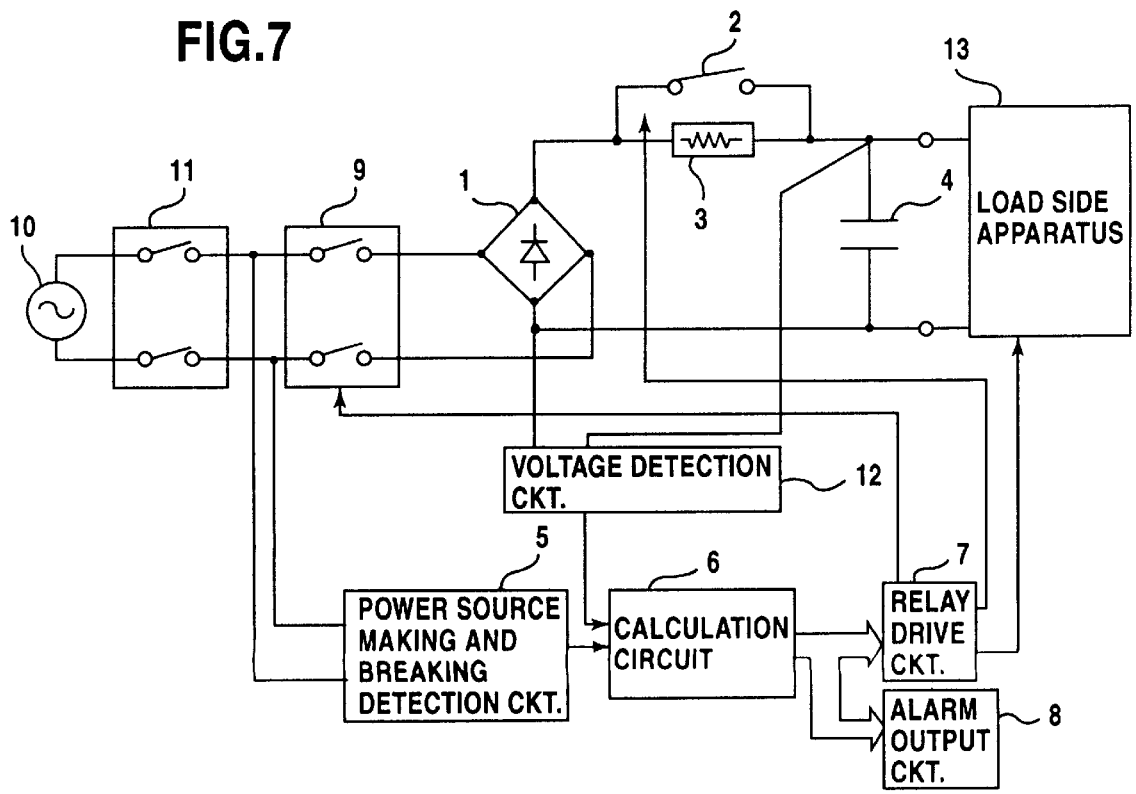
FIG. 7 is a view showing a sixth preferred embodiment of the invention.

Next, the fifth and sixth preferred embodiments are illustrated in FIG. 6 and FIG. 7. In FIG. 6 and FIG. 7, the relay drive circuit 7 is provided with an I/O port for sending out not only a relay drive signal but also a control signal such as drive and stop signals, etc., at a load side apparatus. The load side device 13 is, for example, a DC/DC converter or an inverter circuit to drive a motor. In addition, the load side apparatus 13 also includes a circuit for discharging an electric charge charged in the smoothing capacitor 4 when turning off the alternate current power source 10.

In the fifth and sixth preferred embodiments, the load side is not particularly limited (That is, it includes a passive load, a positive load, and other devices). If a load side drive can be controlled, the rush current becomes a small value since a charged charge still remains in the smoothing capacitor when making the alternate current power source 10 as the second time by making the smoothing capacitor direct current voltage output non-loaded. Therefore, where the mean power exceeds permissible power of the resistor 3 for preventing a rush current by repeated making and breaking of the power source, energy resulting from a rush current can be reduced by stopping drive of the load side apparatus when the power source is made next, wherein it is also possible to reduce the load of the resistor for preventing a rush current. In comparison with a case where only alarm indication or alarm output is performed, there is an advantage by which anything abnormal can be easily noticeable by driving and stopping the load side apparatus. Also, a drive and stop signal is given to the load side device 13 by an instruction from the calculation circuit 6 via the relay drive circuit 7.

INDUSTRIAL APPLICABILITY

With the invention, since it is possible to protect a resistor 3 for preventing a rush current from being burnt out or interrupted even if a power source is frequently turned on and off, a serious accident such as a fire, etc., of a power source apparatus due to burn-out of the resistor 3 for preventing a rush current can be prevented from occurring.

Further, since a rush current cannot be prevented by a resistor 3 for preventing a rush current if the power source is made next in a case where only interruption occurs without resulting in a burn-out accident, an excessive current flow through a relay 2 for short-circuiting the resistor for preventing a rush current when charging a smoothing capacitor, wherein secondary breakage such as a collapse of a rectification diode, and welding of the relay 2, etc., may occur. However, the invention can prevent danger due to such secondary breakage.

In addition, charging energy of a capacitor can be accurately obtained by detecting the terminal voltage of the smoothing capacitor 4 without being influenced by fluctuations in the input alternate current power source voltage, and imbalance, etc., in the capacitor capacity, whereby it is possible to optimally select margins in design of a resistor 3 for preventing a rush current can be carried out.

In addition, in the case of a power source apparatus which is commonly used for 100V-based and 200V-based alternate current power sources, since it is possible to avoid trouble resulting from mistakes in setting of calculation constants, a more reliable power source apparatus can be provided.

What is claimed is:

1. A method for protecting a resistor for preventing a rush current, being featured in that energy charged in a smoothing capacitor, when making a power source, is calculated from capacity of a smoothing capacitor of a capacitor input type rectification circuit and a value of a rectification smoothing direct current voltage, a mean power is calculated from said energy and the number of times of making and breaking the power source, which have been carried out in a certain determined period of time, whereby a warning is issued by an alarm indication and alarm output when the mean power exceeds the permissible power of the resistor for preventing the rush current when making the power source.

2. A method for protecting a resistor for preventing a rush current, being featured in that energy charged in a smoothing capacitor, when making a power source, is calculated from a capacity of a smoothing capacitor of a capacitor input type rectification circuit and a value of a rectification smoothing direct current voltage, a mean power is calculated from said energy and the number of times of making and breaking the power source, which have been carried out in a certain determined period of time, and interlocking is provided so as not to make the power source when the mean power exceeds the permissible power of the resistor for preventing the rush current when making the power source.

3. A method for protecting a resistor for preventing a rush current, being featured in that energy charged in a smoothing capacitor, when making a power source, is calculated from a capacity of a smoothing capacitor of a capacitor input type rectification circuit and a value of a rectification smoothing direct current voltage, a mean power is calculated from said energy and the number of times of making and breaking the power source, which have been carried out in a certain determined period of time, whereby the drive of a load side apparatus is stopped when the mean power exceeds permissible power of a resistor for preventing a rush current when making the power source.

4. A method for protecting a resistor for preventing a rush current, being featured in that, in a power source apparatus having a capacitor input type rectification circuit, the number of times of making and breaking a power source, which have been carried out in a certain determined period of time, is counted, and a warning is issued by alarm indication or alarm output when the number of times of making and breaking the power source exceeds an appointed number of times.

5. A method for protecting a resistor for preventing a rush current, being featured in that, in a power source apparatus having a capacitor input type rectification circuit, the number of times of making and breaking a power source, which have been carried out in a certain determined period of time, is counted, and interlocking is provided so as not to make the power source when the number of times of making and breaking the power source exceeds an appointed number of times.

6. A method for protecting a resistor for preventing a rush current, being featured in that, in a power source apparatus having a capacitor input type rectification circuit, the number of times of making and breaking a power source, which have been carried out in a certain fixed period of time, is counted, whereby the drive of a load side apparatus is stopped when the number of times of making and breaking the power source exceeds an appointed number of times.

* * * * *